(12) United States Patent
Tsubone

(10) Patent No.: US 11,879,534 B2
(45) Date of Patent: Jan. 23, 2024

(54) FLEXIBLE EXTERNAL GEAR, WAVE REDUCER, AND ROBOT

(71) Applicant: Nidec-Shimpo Corporation, Nagaokakyo (JP)

(72) Inventor: Taihei Tsubone, Nagaokakyo (JP)

(73) Assignee: NIDEC-SHIMPO CORPORATION, Kyoto (JP)

( * ) Notice: Subject to any disclaimer, the term of this patent is extended or adjusted under 35 U.S.C. 154(b) by 0 days.

(21) Appl. No.: 17/989,750

(22) Filed: Nov. 18, 2022

(65) Prior Publication Data

US 2023/0160462 A1 May 25, 2023

(30) Foreign Application Priority Data

Nov. 22, 2021 (JP) .................. 2021-189298

(51) Int. Cl.
  *F16H 49/00* (2006.01)
  *B25J 9/10* (2006.01)
  *F16H 55/14* (2006.01)

(52) U.S. Cl.
  CPC ............ *F16H 49/001* (2013.01); *B25J 9/102* (2013.01); *F16H 55/14* (2013.01); *F16H 2049/003* (2013.01)

(58) Field of Classification Search
  CPC ............ F16H 49/001; F16H 2049/003; F16H 55/0833
  See application file for complete search history.

(56) References Cited

U.S. PATENT DOCUMENTS

| | | | | |
|---|---|---|---|---|
| 4,817,457 A | * | 4/1989 | Carlson | F16H 49/001 29/893.35 |
| 4,934,212 A | | 6/1990 | Hofmeister | |
| 5,269,202 A | * | 12/1993 | Kiyosawa | F16H 49/001 74/640 |
| 5,850,765 A | * | 12/1998 | Shirasawa | F16H 49/001 475/162 |
| 6,202,508 B1 | * | 3/2001 | Takizawa | F16H 49/001 74/411 |
| 10,352,427 B2 | * | 7/2019 | Takizawa | F16H 49/001 |
| 10,890,239 B2 | * | 1/2021 | Takizawa | F16H 49/001 |
| 2018/0187763 A1 | * | 7/2018 | Xie | F16H 49/001 |
| 2022/0186821 A1 | * | 6/2022 | Kataoka | B25J 9/1025 |

FOREIGN PATENT DOCUMENTS

| | | | | |
|---|---|---|---|---|
| CN | 112762157 A | * | 5/2021 | ........... F16H 49/001 |
| JP | 6-17888 A | | 1/1994 | |

* cited by examiner

*Primary Examiner* — Bobby Rushing, Jr.
(74) *Attorney, Agent, or Firm* — Keating & Bennett, LLP

(57) ABSTRACT

A gear includes a tubular portion and a diaphragm portion. The diaphragm portion extends in a direction including a radial component from one axial end portion of the tubular portion. The portion includes a first portion and a second portion. The first portion is on one axial side of the portion. The second portion is on another axial side relative to the first portion. The second portion includes teeth protruding radially outward. A maximum value of a thickness of the diaphragm portion is equal to or less than twice a distance from radially outer ends of the teeth to a radially inner surface of the second portion, and a minimum value of a thickness of the first portion is equal to or less than half the maximum value of the thickness of the diaphragm portion.

20 Claims, 6 Drawing Sheets ent
US 11,879,534 B2

FLEXIBLE EXTERNAL GEAR, WAVE REDUCER, AND ROBOT

CROSS-REFERENCE TO RELATED APPLICATIONS

The present application claims priority under 35 U.S.C. § 119 to Japanese Patent Application No. 2021-189298, filed on Nov. 22, 2021, the entire contents of which are hereby incorporated herein by reference.

1. Field of the Invention

The present disclosure relates to a flexible external gear, a wave reducer, and a robot.

2. Background

Conventionally, a wave gear device including a flexible external gear and an internal gear is known. This type of wave gear device is mainly used as a reducer.

A conventional strain wave gear device includes a cup-shaped strain gear having external teeth, a ring gear having internal teeth, and a wave generator that causes relative rotation between the strain gear and the ring gear. The strain gear is formed of a strain gear blank having a uniform thickness of 0.015 D to 0.03 D (D: inner diameter of strain gear). The strain gear has a cylindrical portion in which external teeth are formed around an opening end, and an end portion including a diaphragm having a thickness half the thickness of the cylindrical portion.

The opening end of the strain gear comes into contact with the wave generator and is deformed into an elliptical shape. This causes the external teeth of the strain gear to engage with the internal teeth of the ring gear along each side of the elliptical major axis. Here, the number of external teeth of the strain gear and the number of internal teeth of the ring gear are different from each other. Due to this, the strain gear and the ring gear move relative to each other by rotation of the wave generator. However, in the conventional strain gear, it is conceivable to be difficult to favorably bend the cylindrical portion.

SUMMARY

An example embodiment of the present disclosure is a flexible external gear including a tubular portion extending in a direction including a component in a central axis direction, and a diaphragm portion extending in a direction including a radial component from one axial end portion of the tubular portion. The tubular portion includes a first portion on one axial side, the first portion having flexibility, and a second portion on another axial side relative to the first portion. The second portion includes external teeth protruding radially outward and arrayed in a circumferential direction, a maximum value of a thickness of the diaphragm portion is equal to or less than twice a length from a radially outer end of the external teeth to a radially inner surface of the second portion, and a minimum value of a thickness of the first portion is equal to or less than half the maximum value of the thickness of the diaphragm portion.

The above and other elements, features, steps, characteristics and advantages of the present disclosure will become more apparent from the following detailed description of the example embodiments with reference to the attached drawings.

DETAILED DESCRIPTION

Hereinafter, example embodiments of the present application will be described with reference to the drawings.

Figure 1:
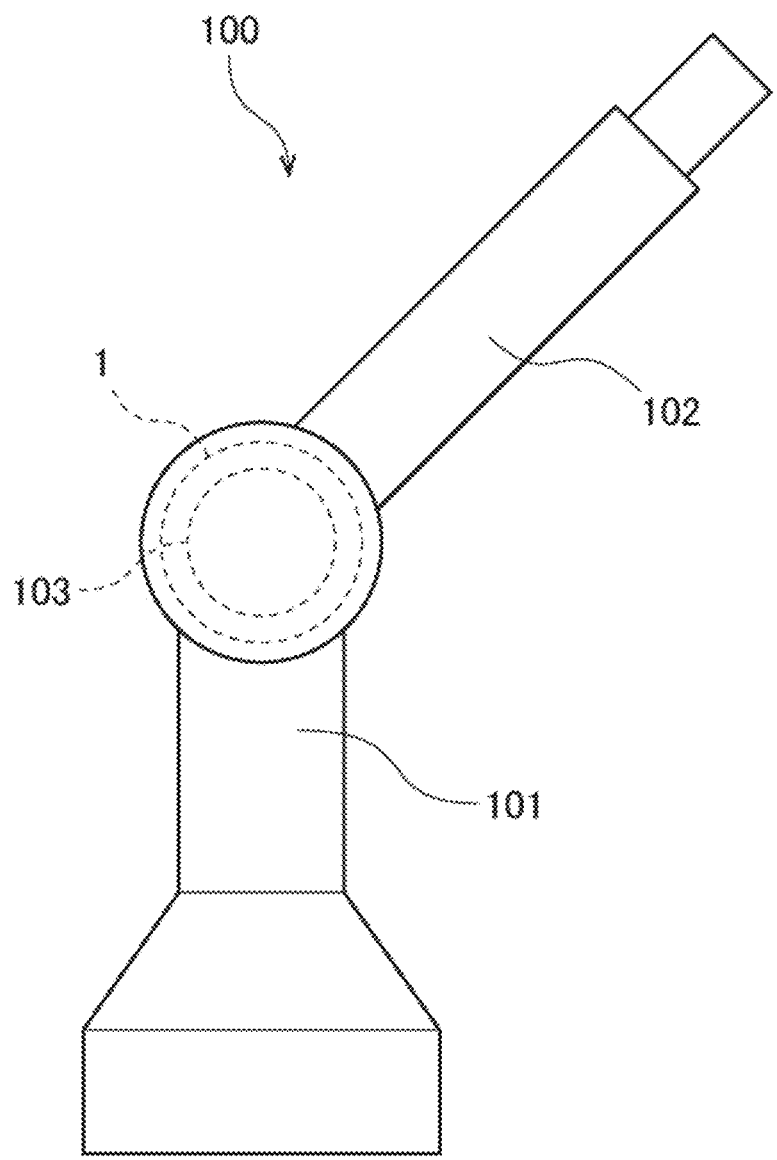
FIG. 1 is a schematic view of a robot according to a preferred embodiment of the present invention.

FIG. 1 is a schematic view of a robot 100 equipped with a wave reducer 1 according to one example embodiment. For example, the robot 100 is a so-called industrial robot that performs works such as conveyance, processing, and assembly of components in a manufacturing line of an industrial product. As illustrated in FIG. 1, the robot 100 includes the wave reducer 1. In the present example embodiment, the robot 100 includes a base frame 101, an arm 102, a motor 103, and the wave reducer 1. This allows the wave reducer 1 equipped on the robot 100 to favorably bend an entire tubular portion 21 including a first tubular portion 211 described later.

The arm 102 is rotatably supported with respect to the base frame 101. The motor 103 and the wave reducer 1 are incorporated in a joint portion between the base frame 101 and the arm 102. When a drive current is supplied to the motor 103, a rotational motion is output from the motor 103. The rotational motion output from the motor 103 is decelerated by the wave reducer 1 and transmitted to the arm 102. Due to this, the arm 102 rotates with respect to the base frame 101 at a speed after deceleration.

Next, the entire structure of the wave reducer 1 will be described.

Hereinafter, a direction parallel to a central axis 9 of the wave reducer 1 is referred to as "axial", a direction perpendicular to the central axis 9 of the wave reducer 1 is referred to as "radial", and a direction along an arc about the central axis 9 of the wave reducer 1 is referred to as "circumferential". The "parallel" mentioned above includes both "parallel" and "substantially parallel". Moreover, the "perpendicular" mentioned above includes both "perpendicular" and "substantially perpendicular". In the present application, in FIGS. 2, 4, and 5 described later, the shape and the positional relationship of each part will be described with the axial direction as a left-right direction, the left side as "one axial side", and the right side as "other axial side".

Figure 2:
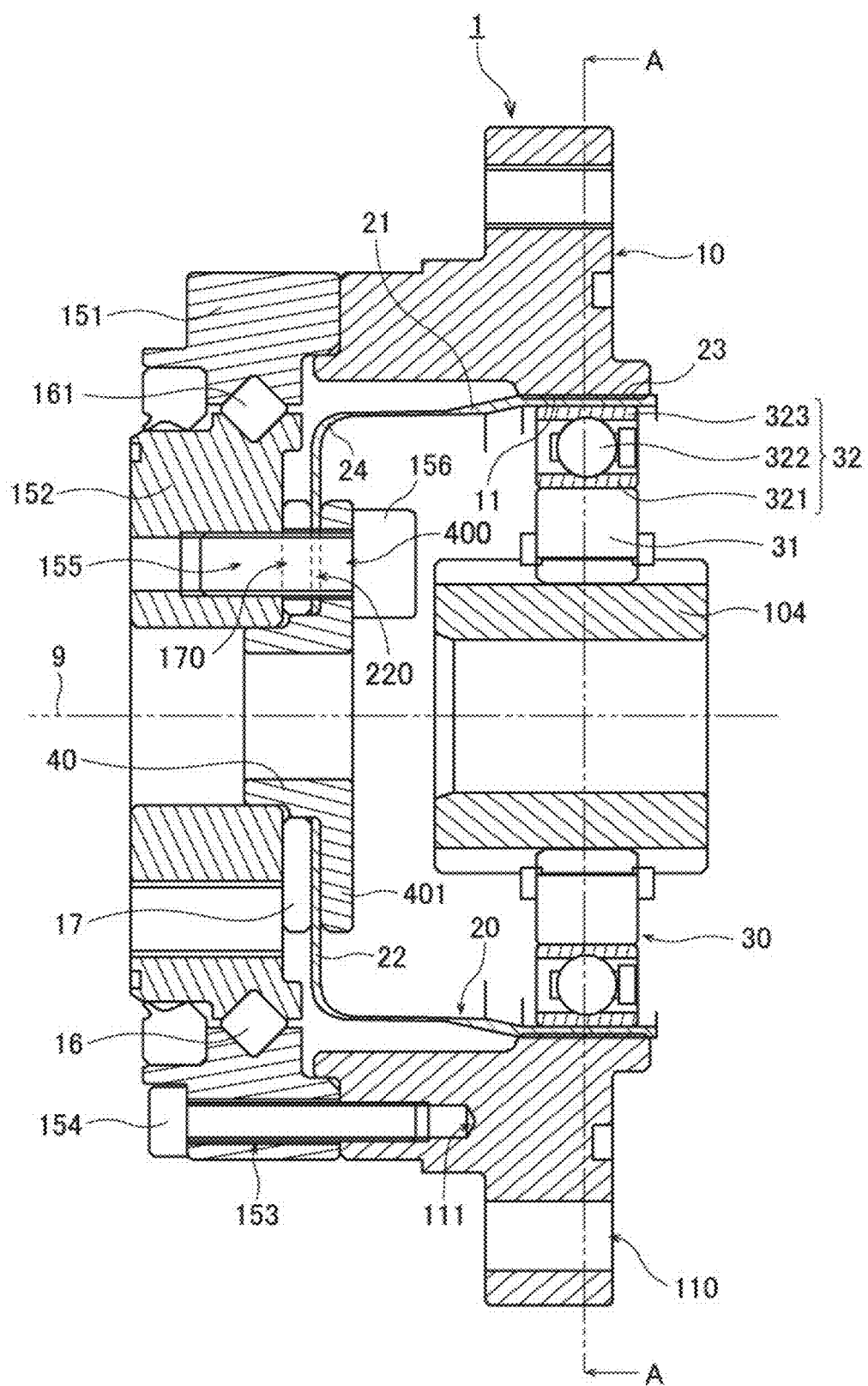
FIG. 2 is a longitudinal cross-sectional view of a wave reducer according to a preferred embodiment of the present invention.
Figure 3:
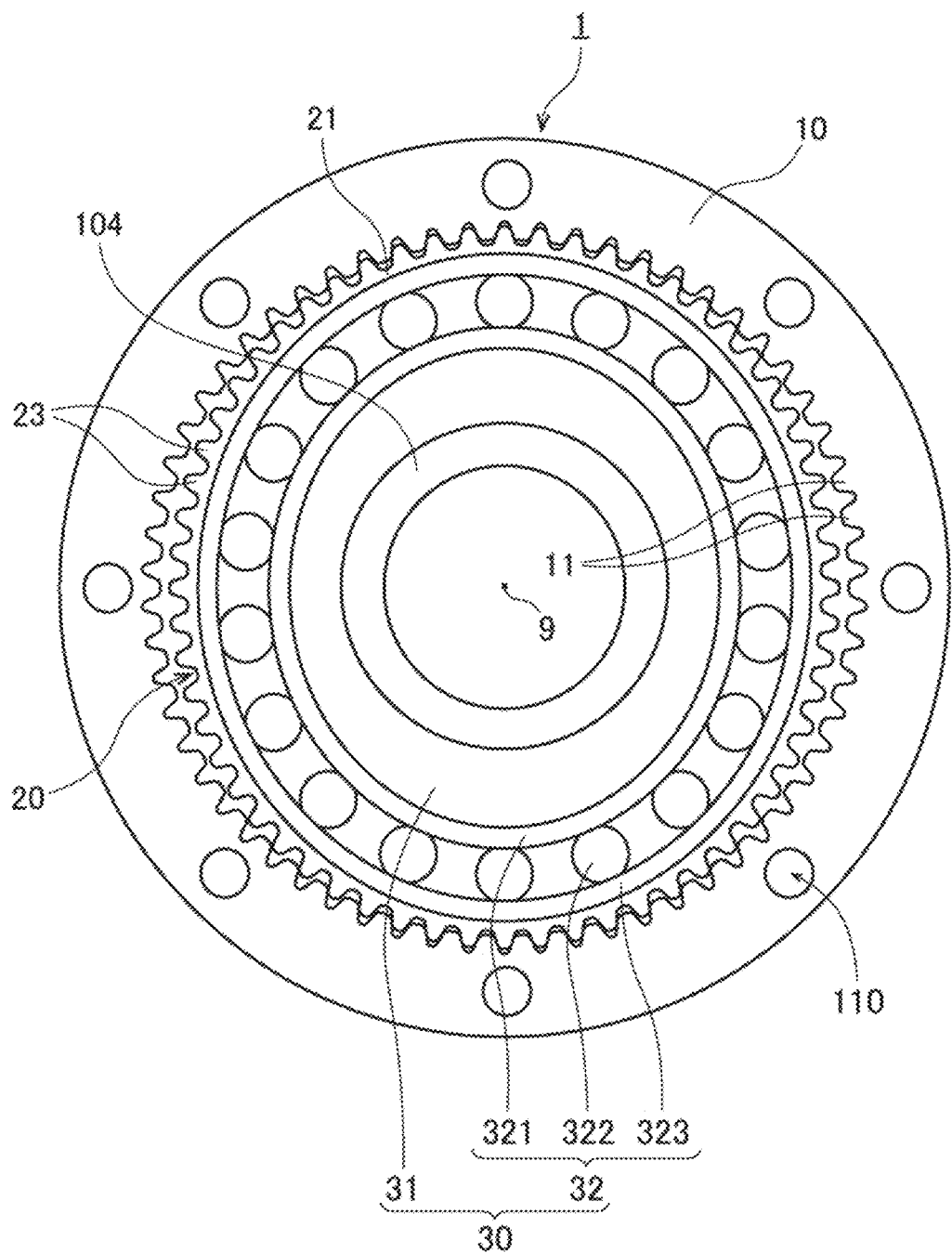
FIG. 3 is a transverse cross-sectional view of the wave reducer.

FIG. 2 is a longitudinal cross-sectional view of the wave reducer 1 according to one example embodiment. FIG. 3 is a transverse cross-sectional view of the wave reducer 1 viewed from A-A position in FIG. 2. To avoid complication of the drawings, hatching that indicates a cross section is not illustrated in FIG. 3. As described above, the wave reducer 1 is equipped on the joint portion of the robot 100, and decelerates and outputs rotational motion input from the motor 103. More specifically, the wave reducer 1 is a device that, by using a differential between an internal gear 10 and a flexible external gear 20 described later, reduces a rotational motion at a first rotational speed obtained from the motor 103 to a second rotational speed lower than the first rotational speed.

As illustrated in FIGS. 2 and 3, the wave reducer 1 includes the internal gear 10, the flexible external gear 20, and a wave generator 30. The wave reducer 1 of the present example embodiment further includes an outer ring 151, an inner ring 152, and an output unit 40.

The wave reducer 1 is provided with an input member 104 for obtaining power from the motor 103. The input member 104 extends in a tubular shape in the axial direction about the central axis 9. An output shaft of the motor 103 is inserted radially inside the input member 104. The input member 104 is fixed with the output shaft of the motor 103 so as to be relatively non-rotatable with respect to each other. Due to this, the input member 104 rotates at the first rotational speed about the central axis 9 together with a rotating portion of the motor 103. The input member 104 may be the same member as the output shaft.

The internal gear 10 is an annular gear about the central axis 9. The internal gear 10 is fixed to the base frame 101 of the robot 100. The internal gear 10 is arranged to be coaxial with the central axis 9. As described later, the flexible external gear 20 has a second tubular portion 212. The internal gear 10 is arranged radially outside the second tubular portion 212. The rigidity of the internal gear 10 is sufficiently higher than the rigidity of the tubular portion 21 described later of the flexible external gear 20. For this reason, the internal gear 10 can be regarded as a substantially rigid body. The internal gear 10 has a plurality of internal teeth 11. The plurality of internal teeth 11 protrude radially inward from a radially inner surface of the internal gear 10. The plurality of internal teeth 11 are arrayed at a constant pitch in the circumferential direction on the inner surface of the internal gear 10.

The internal gear 10 is provided with a plurality of through holes 110. In the present example embodiment, the number of the through holes 110 is 8. Each of the eight through holes 110 penetrates the internal gear 10 in the axial direction. The eight through holes 110 are arranged at equal intervals in the circumferential direction about the central axis 9. The internal gear 10 is fixed to the base frame 101 of the robot 100 by fastening screws (not illustrated) penetrating the respective eight through holes 110 to the base frame 101. The internal gear 10 is provided with a plurality of screw holes 111. Each of the plurality of screw holes 111 is recessed from the end surface on one axial side of the internal gear 10 toward the other axial side. The screw hole 111 may be a through hole.

Figure 4:
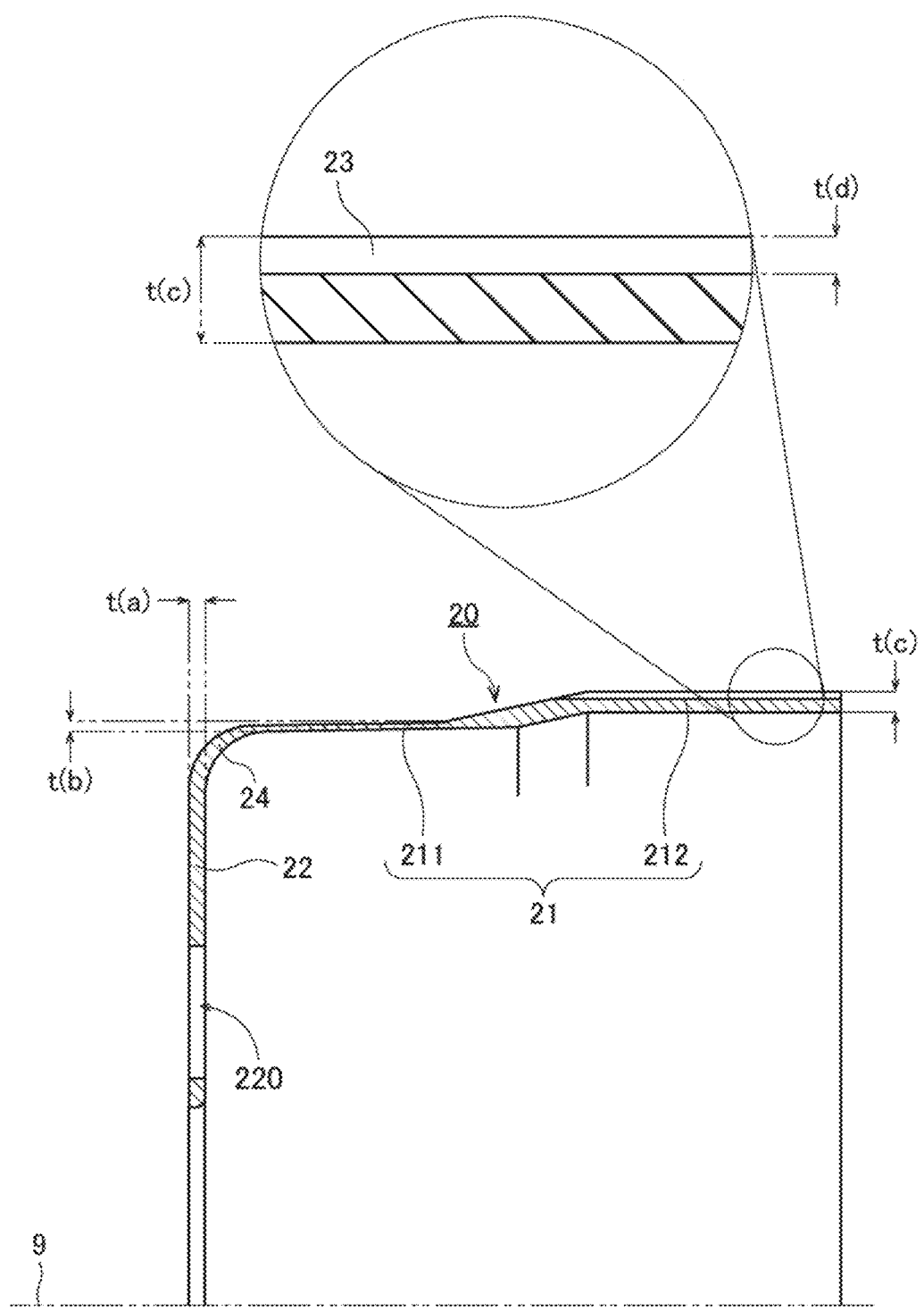
FIG. 4 is a partial longitudinal cross-sectional view of a flexible external gear according to a preferred embodiment of the present invention.

The flexible external gear 20 is a bendable and deformable bottomed annular gear. As described later, the flexible external gear 20 is fixed to the arm 102 of the robot 100 via the output unit 40 and the inner ring 152. The flexible external gear 20 is rotatably supported about the central axis 9. FIG. 4 is a partial longitudinal cross-sectional view in which a part of the flexible external gear 20 is enlarged. As illustrated in FIGS. 2 to 4, the flexible external gear 20 includes the tubular portion 21 and a diaphragm portion 22.

The tubular portion 21 extends in a direction including a component in the central axis 9 direction. In the present example embodiment, the tubular portion 21 extends in a tubular shape in the axial direction about the central axis 9. The tubular portion 21 is a flexible site that can be bent in the radial direction. In particular, the end portion on the other axial side of the tubular portion 21 (hereinafter referred to as "other axial end portion") is a free end, and therefore it can be displaced in the radial direction more greatly than another part. The other axial end portion of the tubular portion 21 is positioned radially outside the wave generator 30 and radially inside the internal gear 10.

The tubular portion 21 includes the first tubular portion 211 and the second tubular portion 212. The first tubular portion 211 is arranged on one axial side of the tubular portion 21 and has flexibility. The first tubular portion 211 is a radially bendable tubular site.

The second tubular portion 212 is arranged on the other axial side relative to the first tubular portion 211. The second tubular portion 212 is positioned radially inside the internal gear 10. The second tubular portion 212 has a plurality of external teeth 23. The plurality of external teeth 23 are arrayed in the circumferential direction. Each of the plurality of external teeth 23 protrudes radially outward. The plurality of external teeth 23 are arrayed at a constant pitch along the circumferential direction. As described in detail later, an outer ring 323 of a flexible bearing 32 comes into contact with the inner peripheral surface of the second tubular portion 212. Due to this, a part of the plurality of external teeth 23 and a part of the plurality of internal teeth 11 mesh with each other. That is, when the tubular portion 21 is pushed by the wave generator 30 from the radially inside, a part of the plurality of external teeth 23 and a part of the plurality of internal teeth 11 of the internal gear 10 mesh with each other. The number of the internal teeth 11 included in the internal gear 10 is slightly different from the number of the external teeth 23 included in the flexible external gear 20.

The diaphragm portion 22 is a site extending in a direction including a radial component from an end portion on one axial side of the tubular portion 21 (hereinafter referred to as "one axial end portion"). That is, the diaphragm portion 22 extends in a direction including a radial component from one axial end portion of the tubular portion 21. In the present example embodiment, the diaphragm portion 22 extends radially inward from one axial end portion of the tubular portion 21. The diaphragm portion 22 extends annularly about the central axis 9. The diaphragm portion 22 is a flat plate-like site that is less likely to bend than the tubular portion 21. Since the diaphragm portion 22 includes such a structure, the flexible external gear 20 can be downsized in the radial direction. The diaphragm portion 22 is provided with a plurality of through holes 220. Each of the plurality of through holes 220 penetrates the diaphragm portion 22 in the axial direction. The diaphragm portion 22 may extend radially outward from one axial end portion of the tubular portion 21.

A thickness t(a) of the diaphragm portion 22 is substantially constant from a radially inner end to a radially outer end of the diaphragm portion 22. In the present example embodiment, the thickness t(a) of the diaphragm portion 22 is a width in the axial direction. This makes it possible to easily manufacture, at the time of manufacturing the flexible external gear 20, the diaphragm portion 22 as compared with the case where the thickness t(a) of the diaphragm portion 22 is not constant.

Figure 5:
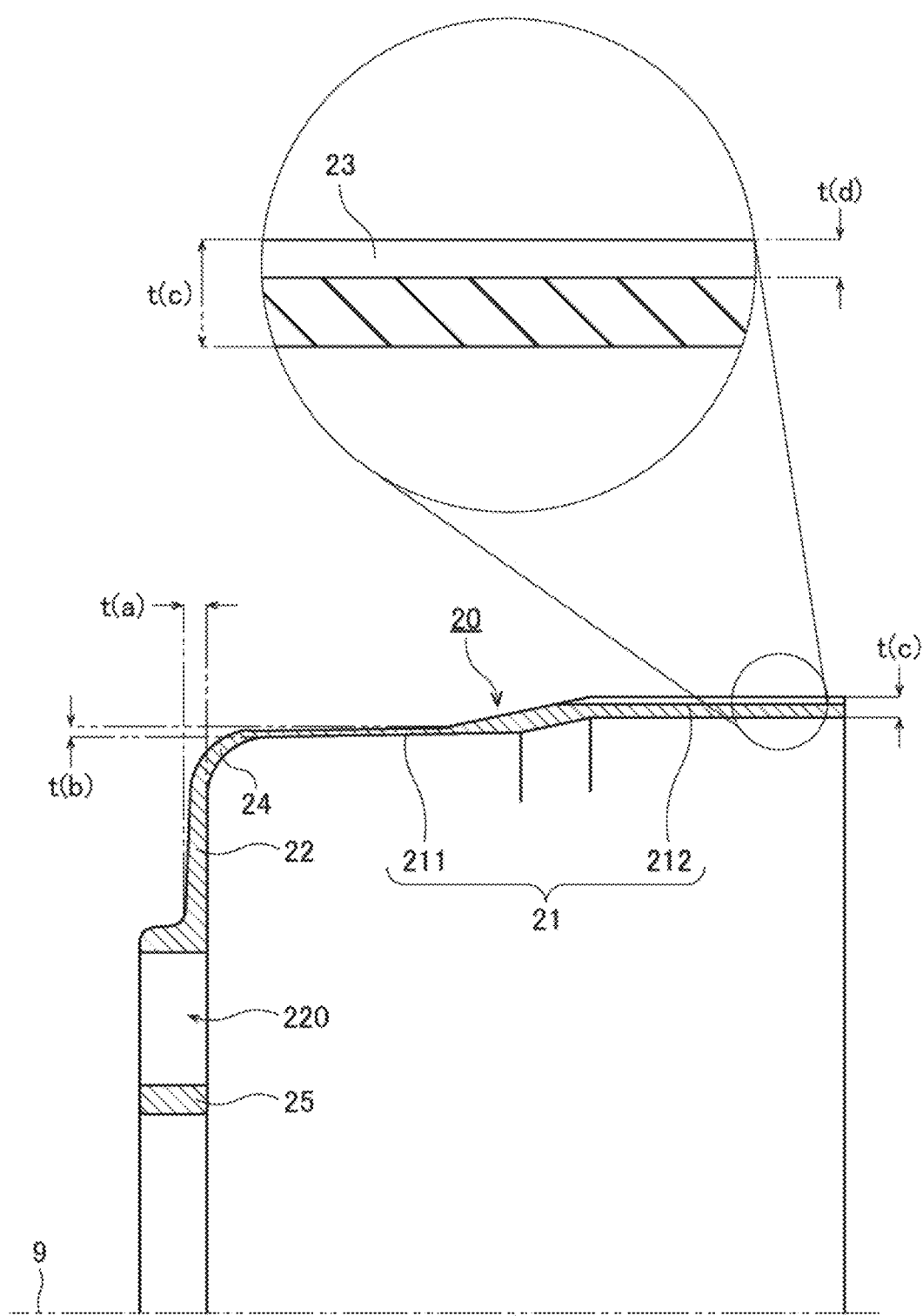
FIG. 5 is a partial longitudinal cross-sectional view of a flexible external gear according to a modification of a preferred embodiment of the present invention.

However, the thickness t(a) of the diaphragm portion 22 needs not be constant from the radially inner end to the radially outer end of the diaphragm portion 22. For example, as illustrated in the modification of FIG. 5, a thick portion 25 having a larger axial thickness than the diaphragm portion 22 may be formed on the radially inside of the diaphragm portion 22. The thickness of the diaphragm portion 22 in the axial direction may gradually increase toward the thick portion 25. The plurality of through holes 220 may be provided in the thick portion 25.

The tubular portion 21 further includes a connection portion 24. The connection portion 24 extends in a direction having both axial and radial components. The connection portion 24 connects one axial end portion of the first tubular portion 211 and a radial end portion of the diaphragm portion 22. In the present example embodiment, the connection portion 24 connects one axial end portion of the first tubular portion 211 and the radially outer end portion of the diaphragm portion 22.

A more detailed structure of the flexible external gear 20 will be described later.

The wave generator 30 is a mechanism that generates periodical bending deformation in the tubular portion 21. The wave generator 30 is arranged radially inside the second tubular portion 212. The wave generator 30 of the present example embodiment includes a cam 31 and a flexible bearing 32. The cam 31 and the flexible bearing 32 each extend annularly about the central axis 9. The cam 31 is fixed to the outer surface of the input member 104 so as to be relatively non-rotatable with respect to each other, and is supported rotatably about the central axis 9. The cam 31 of the present example embodiment has an elliptical cam profile. That is, a radially outer surface of the cam 31 has an elliptical shape when viewed in the axial direction, and has different outer diameters depending on the circumferential position. The flexible bearing 32 is a bearing that is bending deformable. The flexible bearing 32 is arranged between the radially outer surface of the cam 31 and the radially inner surface of the tubular portion 21 of the flexible external gear 20. Accordingly, the cam 31 and the tubular portion 21 can rotate at different rotational speeds.

The flexible bearing 32 has an inner ring 321, a plurality of balls 322, and an elastically deformable outer ring 323. The inner ring 321 comes into contact with the radially outer surface of the cam 31. The plurality of balls 322 are interposed between the inner ring 321 and the outer ring 323 and arrayed along the circumferential direction. The outer ring 323 elastically deforms (bending deforms) via the inner ring 321 and the balls 322 along the cam profile of the rotating cam 31. The outer ring 323 comes into contact with the radially inner surface of the tubular portion 21 of the flexible external gear 20. For this reason, the tubular portion 21 is deformed in an elliptical shape along the radially outer surface of the cam 31. As a result, the external teeth 23 of the flexible external gear 20 and the internal teeth 11 of the internal gear 10 mesh with each other at two positions corresponding to both ends of the elliptical major axis. However, the external teeth 23 and the internal teeth 11 do not mesh with each other at another position in the circumferential direction. Thus, the ball bearing is used as the flexible bearing 32 of the present example embodiment. However, other types of bearings such as a roller bearing may be used instead of the ball bearing.

When the motor 103 is driven, the cam 31 rotates at the first rotational speed about the central axis 9 together with the rotating portion of the motor 103 and the input member 104. Due to this, the elliptical major axis of the flexible external gear 20 also rotates at the first rotational speed. Then, the meshing position between the external tooth 23 and the internal tooth 11 also changes at the first rotational speed in the circumferential direction. As described above, the number of the internal teeth 11 of the internal gear 10 is slightly different from the number of the external teeth 23 of the flexible external gear 20. Due to this difference in the number of teeth, the combination of meshing between the external teeth 23 and the internal teeth 11 slightly changes in the circumferential direction every rotation of the cam 31. Here, as described above, the internal gear 10 is fixed to the base frame 101 of the robot 100 and does not rotate. As a result, the flexible external gear 20 rotates about the central axis 9 at the second rotational speed lower than the first rotational speed with respect to the internal gear 10 and the base frame 101.

The outer ring 151 is a member that extends in an annular shape about the central axis 9. Both the outer ring 151 and the inner ring 152 have high rigidity. The outer ring 151 is provided with a plurality of through holes 153. Each of the plurality of through holes 153 penetrates the outer ring 151 in the axial direction. The outer ring 151 is fixed to the internal gear 10 by fastening a plurality of screws 154 respectively penetrating the plurality of through holes 153 to the plurality of screw holes 111 of the internal gear 10 adjacent to the other axial side of the outer ring 151.

The inner ring 152 is arranged radially inside the outer ring 151. The inner ring 152 is a member that extends in an annular shape about the central axis 9. The arm 102 of the robot 100 is fixed to the inner ring 152. The inner ring 152 has an outer diameter slightly smaller than the inner diameter of the outer ring 151. The inner ring 152 is provided with a plurality of screw holes 155. Each of the plurality of screw holes 155 is formed from the end surface on the other axial side of the inner ring 152 toward one axial side.

The inner ring 152 is rotatably connected to the outer ring 151 by a bearing 16. As the bearing 16 of the present example embodiment, a cross roller bearing is used. As illustrated in FIG. 2, the bearing 16 has a plurality of cylindrical rollers 161 between the inner peripheral surface of the outer ring 151 and the outer peripheral surface of the inner ring 152. The plurality of cylindrical rollers 161 are arranged with alternately changing orientations between an annular V groove provided on the inner peripheral surface of the outer ring 151 and an annular V groove provided on the outer peripheral surface of the inner ring 152. Due to this, the outer ring 151 and the inner ring 152 are connected with high rigidity while allowing rotation of the inner ring 152 with respect to the outer ring 151. Such a cross roller bearing can give sufficient rigidity in the axial direction and the radial direction even without being paired when used like a ball bearing. That is, use of the cross roller bearing can reduce the number of bearings provided in the wave reducer 1. This makes it possible to reduce the weight of the bearing 16, and suppress the axial dimension of the bearing 16.

The output unit 40 is a member for extracting power after deceleration. The output unit 40 extends in a cylindrical shape along the central axis 9. As illustrated in FIG. 2, the other axial end portion of the output unit 40 is provided with an output flange portion 401 extending radially outward. The output flange portion 401 is provided with a plurality of through holes 400. Each of the plurality of through holes 400 penetrates the output flange portion 401 in the axial direction.

As illustrated in FIG. 2, the diaphragm portion 22 of the flexible external gear 20 is arranged on one axial side of the output flange portion 401. On one axial side of the diaphragm portion 22, a washer 17 is interposed, and the inner ring 152 is further arranged. The number of the washers 17 to be arranged may be one or more. The washer 17 is not necessarily arranged. This makes it possible to easily adjust the axial positions of the flexible external gear 20 and the output unit 40 with respect to the inner ring 152.

The washer 17 is provided with a plurality of through holes 170. Each of the plurality of through holes 170 penetrates the washer 17 in the axial direction. The flexible external gear 20 and the output unit 40 are axially fixed to the inner ring 152 by fastening a plurality of screws 156 respectively penetrating the plurality of through holes 220 of the flexible external gear 20 and the plurality of through holes 400 of the output unit 40 to the plurality of screw holes 155 of the inner ring 152 via the plurality of through holes 170 of the washer 17. Due to this, the inner ring 152, the flexible external gear 20, and the output unit 40 are coupled with one another so as to be relatively non-rotatable.

Here, as described above, the inner ring 152 is rotatably supported with respect to the outer ring 151 and the internal gear 10 via the bearing 16. Due to this, the flexible external gear 20 fixed to the inner ring 152, the output unit 40, and the arm 102 of the robot 100 can rotate about the central axis 9 with respect to the base frame 101 to which the internal gear 10 is fixed. As a result, when the motor 103 is driven, the flexible external gear 20 and the arm 102 rotate about the central axis 9 at the second rotational speed lower than the first rotational speed that is the output of the motor 103.

Next, a more detailed structure of the flexible external gear 20 will be described. In the following description, the thickness of the tubular portion 21 including the first tubular portion 211 and the second tubular portion 212 indicates the thickness in the normal direction with respect to the direction in which the tubular portion 21 extends when the tubular portion 21 is inclined with respect to the central axis 9, and indicates the thickness in the radial direction when the tubular portion 21 is parallel to the central axis 9.

The flexible external gear 20 can be molded into a final shape by, for example, press working on the basis of a plate-like material to create a cylindrical intermediate member, and then drawing or cutting. The external teeth 23 can be molded by rolling the intermediate member while pressing a roller against the intermediate member. In the present example embodiment, teeth along the axial direction, such as a spur gear, are formed as the external teeth 23. A length t(d) from the radially outer end to the radially inner end of the external tooth 23 may vary depending on the axial and circumferential positions. A length t(c) from the radially outer end of the external teeth 23 to the radially inner surface of the second tubular portion 212 may also change depending on the axial and circumferential positions.

Stainless steel is used as the material for the flexible external gear 20 of the present example embodiment. However, steel having relatively low carbon content, aluminum, or the like may be used as the material for the flexible external gear 20.

Figure 6:
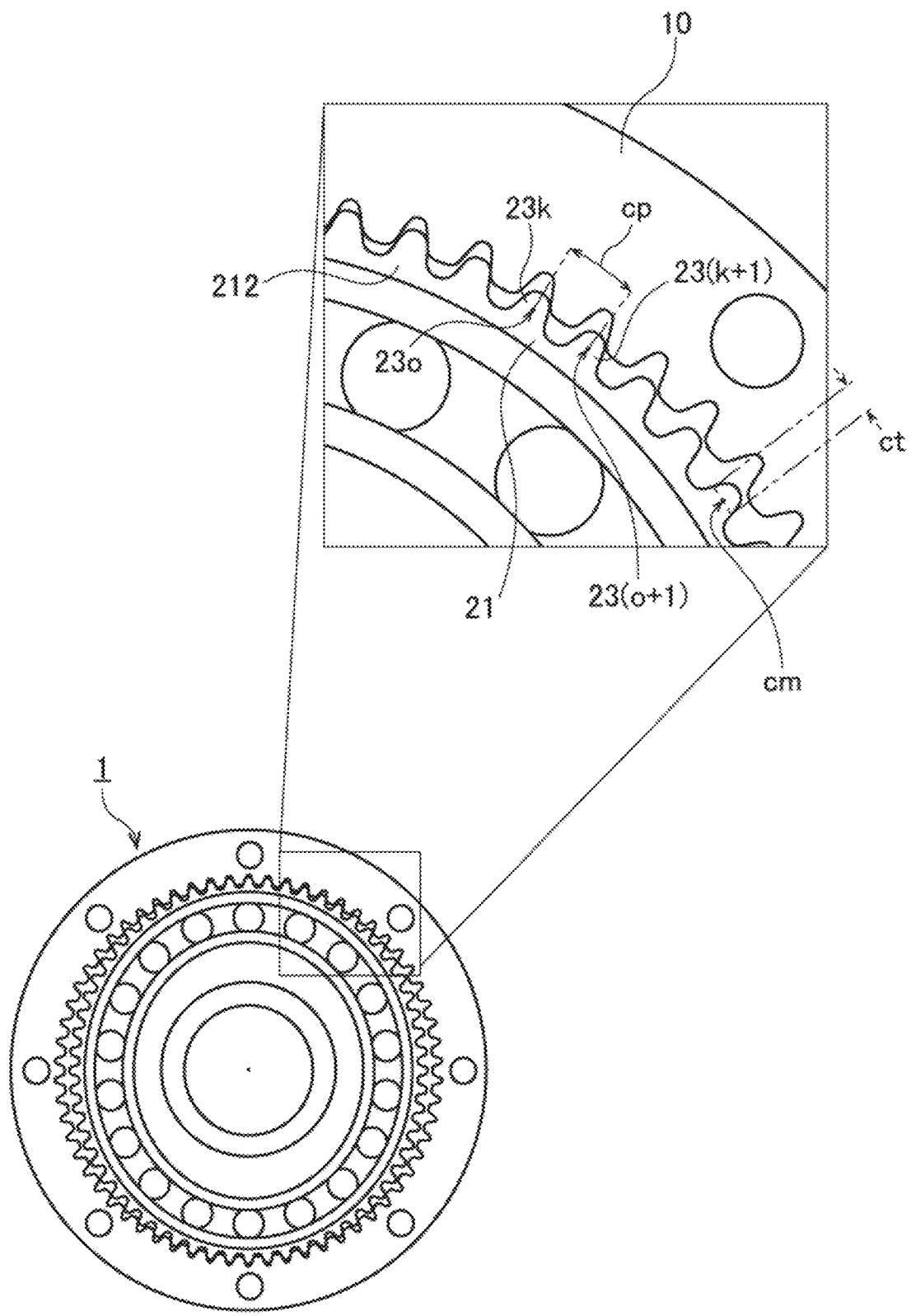
FIG. 6 is an enlarged view of a portion of FIG. 3.

FIG. 6 is an enlarged view of a part of FIG. 3. As illustrated in FIG. 6, hereinafter, the two external teeth 23 adjacent in the circumferential direction in the flexible external gear 20 are referred to as "external tooth 23$k$" and "external tooth 23($k$+1)" in order. The circumferential center of the "external tooth 23$k$" will be referred to as "circumferential center 23$o$", and the circumferential center of the "external tooth 23($k$+1)" will be referred to as "circumferential center 23($o$+1)". In the present example embodiment, the circumferential distance between the circumferential center 23$o$ and the circumferential center 23($o$+1), that is, a circumferential interval cp is larger than twice the value of the radially thinnest site in the thickness t(b) of the first tubular portion 211 illustrated in FIGS. 4 and 5. That is, in the external teeth 23$k$ and 23($k$+1) adjacent in the circumferential direction, the circumferential interval cp between the circumferential centers 23$o$ and 23($o$+1) of the external teeth 23$k$ and 23($k$+1) is larger than twice a minimum value min{t(b)} of the thickness t(b) of the first tubular portion 211. Thus, in the present example embodiment, since the circumferential pitch between the adjacent external teeth 23$k$ and 23($k$+1) is long, the external teeth 23 can be more easily molded.

In the present example embodiment, the circumferential distance between the circumferential center 23$o$ and the circumferential center 23($o$+1), that is, the circumferential interval cp is larger than the value of the axially thinnest site in the thickness t(a) of the diaphragm portion 22 illustrated in FIGS. 4 and 5. That is, in the external teeth 23$k$ and 23($k$+1) adjacent in the circumferential direction, the circumferential interval cp between the circumferential centers 23$o$ and 23($o$+1) of the external teeth 23$k$ and 23($k$+1) is larger than a minimum value min {t(a)} of the thickness t(a) of the diaphragm portion 22. Thus, in the present example embodiment, since the circumferential pitch between the adjacent external teeth 23$k$ and 23($k$+1) is long, the external teeth 23 can be more easily molded.

In the present example embodiment, a maximum value max{t(d)} of the length t(d) from the radially outer end to the radially inner end of the external teeth 23 is larger than the minimum value min{t(b)} of the thickness t(b) of the first tubular portion 211. In this manner, by making the maximum value max{t(d)} of the length t(d) from the radially outer end to the radially inner end of the external tooth 23 larger than the minimum value min{t(b)} of the thickness t(b) of the first tubular portion 211, that is, providing the external teeth 23 to be long to some extent in the radial direction, the external teeth 23 and the internal teeth 11 of the internal gear 10 favorably mesh with each other. This enables the wave reducer 1 to transmit torque more accurately.

In the present example embodiment, a maximum value max{ct} of a tooth thickness ct of the external tooth 23 at a radial midpoint cm between the radially outer end and the radially inner end of the external teeth 23 is smaller than the minimum value min{t(b)} of the thickness t(b) of the first tubular portion 211. Thus, by suppressing the tooth thickness ct of the external teeth 23, the degree of freedom in molding the external teeth 23 can be improved. The meshing between the external teeth 23 and the internal teeth 11 of the internal gear 10 is further improved. The tooth thickness ct may vary depending on the axial direction. The maximum value max{ct} of the tooth thickness ct in the region where the tooth thickness ct is maximized in the axial direction is only required to be smaller than the minimum value min{t(b)} of the thickness t(b) of the first tubular portion 211.

In the present example embodiment, a maximum value max{t(c)} of the length t(c) from the radially outer end of the external teeth 23 to the radially inner surface of the second tubular portion 212 is larger than the minimum value min{t(b)} of the thickness t(b) of the first tubular portion 211 and smaller than twice the minimum value min{t(b)} of the thickness t(b) of the first tubular portion 211. Thus, by making the maximum value max{t(c)} of the length t(c) from the radially outer end of the external teeth 23 to the radially inner surface of the second tubular portion 212 larger than the minimum value min{t(b)} of the thickness t(b) of the first tubular portion 211, it is possible to suppress the external teeth 23 from becoming excessively long in the radial direction by making the maximum value max{t(c)} smaller than twice the minimum value min{t(b)} of the thickness t(b) of the first tubular portion 211 while securing the radial length of the external teeth 23 for favorably meshing with the internal teeth 11 of the internal gear 10 to some extent. As a result, the rigidity of the external teeth 23 can be improved. The length t(c) from the radially outer end of the external teeth 23 to the radially inner surface of the second tubular portion 212 and the thickness t(b) of the first tubular portion 211 may have different values depending on the respective axial position. In that case, it is only required to compare the respective values in the region where the length t(c) from the radially outer end of the external teeth 23 to the radially inner surface of the second tubular portion 212 and the thickness t(b) of the first tubular portion 211 are maximized or minimized.

As illustrated in FIG. 4, in the present example embodiment, the thickness t(a) of the diaphragm portion 22 is substantially the same as the length t(c) from the radially outer end of the external teeth 23 to the radially inner surface of the second tubular portion 212. This makes it possible to easily manufacture the flexible external gear 20 as compared with the case where the thickness t(a) of the diaphragm portion 22 is different from the length t(c) from the radially outer end of the external teeth 23 to the radially inner surface of the second tubular portion 212.

In the present example embodiment, the value of the axially thickest site in the thickness t(a) of the diaphragm portion 22 is equal to or less than twice the length t(c) from the radially outer end of the external teeth 23 to the radially inner surface of the second tubular portion 212. That is, a maximum value max{t(a)} of the thickness t(a) of the diaphragm portion 22 is equal to or less than twice the length t(c) from the radially outer end of the external teeth 23 to the radially inner surface of the second tubular portion 212. In the tubular portion 21 of the flexible external gear 20, the value of the radially thinnest site in the thickness t(b) of the first tubular portion 211 positioned on the diaphragm portion 22 side is equal to or less than half the value of the axially thickest site in the thickness t(a) of the diaphragm portion 22. That is, the minimum value min{t(b)} of the thickness t(b) of the first tubular portion 211 is equal to or less than half the maximum value max{t(a)} of the thickness t(a) of the diaphragm portion 22. Thus, by suppressing the thickness t(b) of the first tubular portion 211, the first tubular portion 211 can be favorably bent in the radial direction while securing the rigidity of the diaphragm portion 22 and the second tubular portion 212. As a result, it is possible to favorably bend the entire tubular portion 21 including the first tubular portion 211. Since the wave reducer 1 includes the flexible external gear 20, it is possible to achieve the wave reducer 1 in which the first tubular portion 211 is favorably bent.

In the present example embodiment, the minimum value min{t(b)} of the thickness t(b) of the first tubular portion 211 is less than half the maximum value max{t(a)} of the thickness t(a) of the diaphragm portion 22. This makes it possible to more favorably bend the first tubular portion 211 in the radial direction while securing rigidity of the diaphragm portion 22 and the second tubular portion 212. Furthermore, in the present example embodiment, the minimum value min{t(b)} of the thickness t(b) of the first tubular portion 211 is equal to or less than half the minimum value min {t(a)} of the thickness t(a) of the diaphragm portion 22. As a result, the first tubular portion 211 can be more favorably bent in the radial direction while securing rigidity of the diaphragm portion 22 and the second tubular portion 212.

As described above, the connection portion 24 is further provided between the first tubular portion 211 and the diaphragm portion 22 of the flexible external gear 20 of the present example embodiment. The connection portion 24 extends in a direction having both axial and radial components while connecting one axial end portion of the first tubular portion 211 and the radially outer end portion of the diaphragm portion 22. Due to this, the first tubular portion 211 and the diaphragm portion 22 can be firmly connected while securing both the flexibility of the first tubular portion 211 and the rigidity of the diaphragm portion 22.

The connection portion 24 has an arc shape curved in a direction having both axial and radial components in a cross section along the central axis 9. As illustrated in FIGS. 2, 4, and 5, in the present example embodiment, the connection portion 24 is curved in an arc shape in a direction having both axial and radial components in a longitudinal cross section along the central axis 9. The maximum value of the curvature radius of the connection portion 24 is equal to or less than 10 times the thickness t(b) of the first tubular portion 211. Thus, by providing the connection portion 24 that curves with a high curvature, it is possible to relax stress concentration at the connection portion 24 while securing bending tendency of the tubular portion 21. That is, since the connection portion 24 has the above-described configuration, for example, stress concentration at the connection portion 24 can be relaxed as compared with a case where the first tubular portion 211 and the diaphragm portion 22 are connected at a right angle.

While an example embodiment of the present disclosure has been described above, the present disclosure is not limited to the above example embodiment. The configurations of each member and each site may be appropriately combined or replaced without departing from the gist of the present disclosure.

Shapes of details of the flexible external gear, the wave reducer, and the robot may be different from the shapes illustrated in the drawings of the above example embodiment.

The present application can be applied to, for example, a flexible external gear, a wave reducer, and a robot.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A flexible external gear comprising:
  a tubular portion extending in a first direction, the first direction including a component which extends in a central axis direction; and
  a diaphragm portion extending in a second direction from one axial end portion of the tubular portion, the second direction including a radial component; wherein
  the tubular portion includes:
    a flexible first portion on one axial side; and
    a second portion on another axial side relative to the first portion;
  the second portion includes external teeth protruding radially outward and arrayed in a circumferential direction;
  a maximum value of a thickness of the diaphragm portion is equal to or less than twice a length from a radially outer end of the external teeth to a radially inner surface of the second portion;
  a minimum value of a thickness of the first portion is equal to or less than half the maximum value of the thickness of the diaphragm portion; and a maximum value of the thickness of the first portion is less than a maximum value of a thickness of the second portion.

2. The flexible external gear according to claim 1, wherein the thickness of the diaphragm portion is substantially constant from a radially inner end to a radially outer end of the diaphragm portion.

3. The flexible external gear according to claim 2, wherein the thickness of the diaphragm portion is substantially the same as a length from a radially outer end of the external teeth to a radially inner surface of the second portion.

4. The flexible external gear according to claim 1, wherein a minimum value of a thickness of the first portion is equal to or less than half a minimum value of the thickness of the diaphragm portion.

5. The flexible external gear according to claim 1, wherein a maximum value of a length from a radially outer end of the external teeth to a radially inner surface of the second portion is larger than the minimum value of the thickness of the first portion and smaller than twice the minimum value of the thickness of the first portion.

6. The flexible external gear according to claim 1, wherein a maximum value of a length from the radially outer end to the radially inner end of the external teeth is larger than the minimum value of the thickness of the first portion.

7. The flexible external gear according to claim 1, wherein in the external teeth adjacent in a circumferential direction, a circumferential interval of a circumferential center of each of the external teeth is larger than twice the minimum value of the thickness of the first portion.

8. The flexible external gear according to claim 1, wherein in the external teeth adjacent in a circumferential direction, a circumferential interval of a circumferential center of each of the external teeth is larger than a minimum value of the thickness of the diaphragm portion.

9. The flexible external gear according to claim 1, wherein a maximum value of a tooth thickness of the external teeth at a radial midpoint between the radially outer end and the radially inner end of the external teeth is smaller than the minimum value of the thickness of the first portion.

10. The flexible external gear according to claim 1, wherein
the tubular portion includes a connection portion that connects one axial end portion of the first portion and a radial end portion of the diaphragm portion; and
the connection portion extends in a third direction, the third direction including both axial and radial components.

11. The flexible external gear according to claim 10, wherein
the connection portion has an arc shape curved in a fourth direction, the fourth direction including both axial and radial components in a cross section along the central axis; and
a maximum value of a curvature radius of the connection portion is equal to or less than 10 times the thickness of the first portion.

12. The flexible external gear according to claim 1, wherein the minimum value of the thickness of the first portion is less than half the maximum value of the thickness of the diaphragm portion.

13. A wave reducer comprising:
the flexible external gear according to claim 1;
a wave generator located radially inside the second portion; and
an internal gear located radially outside the second portion; wherein the internal gear includes internal teeth protruding radially inward from a radially inner surface; and
a portion of the external teeth mesh with a portion of the internal teeth.

14. A robot comprising:
the wave reducer according to claim 13.

15. A flexible external gear comprising:
a tubular portion extending in a first direction, the first direction including a component which extends in a central axis direction; and
a diaphragm portion extending in a second direction from one axial end portion of the tubular portion, the second direction including a radial component; wherein
the tubular portion includes:
a flexible first portion on one axial side; and
a second portion on another axial side relative to the first portion;
the second portion includes external teeth protruding radially outward and arrayed in a circumferential direction;
a maximum value of a thickness of the diaphragm portion is equal to or less than twice a length from a radially outer end of the external teeth to a radially inner surface of the second portion;
a minimum value of a thickness of the first portion is equal to or less than half the maximum value of the thickness of the diaphragm portion; and
in the external teeth adjacent in a circumferential direction, a circumferential interval of a circumferential center of each of the external teeth is larger than twice the minimum value of the thickness of the first portion.

16. The flexible external gear according to claim 15, wherein a minimum value of a thickness of the first portion is equal to or less than half a minimum value of the thickness of the diaphragm portion.

17. The flexible external gear according to claim 15, wherein a maximum value of a length from a radially outer end of the external teeth to a radially inner surface of the second portion is larger than the minimum value of the thickness of the first portion and smaller than twice the minimum value of the thickness of the first portion.

18. A flexible external gear comprising:
a tubular portion extending in a first direction, the first direction including a component which extends in a central axis direction; and
a diaphragm portion extending in a second direction from one axial end portion of the tubular portion, the second direction including a radial component; wherein
the tubular portion includes:
a flexible first portion on one axial side; and
a second portion on another axial side relative to the first portion;
the second portion includes external teeth protruding radially outward and arrayed in a circumferential direction;
a maximum value of a thickness of the diaphragm portion is equal to or less than twice a length from a radially outer end of the external teeth to a radially inner surface of the second portion;
a minimum value of a thickness of the first portion is equal to or less than half the maximum value of the thickness of the diaphragm portion; and
in the external teeth adjacent in a circumferential direction, a circumferential interval of a circumferential center of each of the external teeth is larger than a minimum value of the thickness of the diaphragm portion.

19. The flexible external gear according to claim 18, wherein a minimum value of a thickness of the first portion is equal to or less than half a minimum value of the thickness of the diaphragm portion.

20. The flexible external gear according to claim 18, wherein a maximum value of a length from a radially outer end of the external teeth to a radially inner surface of the second portion is larger than the minimum value of the thickness of the first portion and smaller than twice the minimum value of the thickness of the first portion.

* * * * *